United States Patent [19]

Sawyer, Jr.

[11] 4,089,669
[45] May 16, 1978

[54] SOIL NEUTRALIZING SLURRIES

[75] Inventor: Edgar W. Sawyer, Jr., Hagerstown, Md.

[73] Assignee: International Telephone & Telegraph Corporation, Nutley, N.J.

[21] Appl. No.: 691,110

[22] Filed: May 28, 1976

Related U.S. Application Data

[63] Continuation of Ser. No. 539,214, Jan. 7, 1975, abandoned.

[51] Int. Cl.$^2$ ............................................. C05D 3/02
[52] U.S. Cl. ........................................... 71/11; 71/43; 71/53; 71/63; 71/64 C; 71/64 SC; 423/165; 423/640
[58] Field of Search ................... 71/1, 11, 27, 43, 47, 71/53, 63, 64 C, 64 SC, 29; 423/265, 640, 165; 252/87, 181, 8.5 A; 210/57, 58

[56] References Cited

U.S. PATENT DOCUMENTS

| T940,014 | 11/1975 | Nichols | 71/64 C |
| 1,580,710 | 3/1926 | Chubbuck | 423/640 |
| 2,280,996 | 4/1942 | Booth | 252/8.5 A |
| 2,280,997 | 4/1942 | Booth | 252/8.5 A |
| 2,636,857 | 4/1953 | Bergman | 252/8.5 A |
| 2,703,276 | 3/1955 | Hendrick | 71/1 |
| 2,816,072 | 12/1957 | Watkins | 252/8.5 A |
| 2,995,867 | 8/1961 | Burton | 71/1 |
| 3,096,170 | 7/1963 | Newson | 71/1 |
| 3,148,970 | 9/1964 | Smith | 71/1 |
| 3,214,261 | 10/1965 | Galloway | 71/63 |
| 3,509,066 | 4/1970 | Jacobs | 71/64 C |
| 3,630,937 | 12/1971 | Baum | 252/87 |
| 3,699,048 | 10/1972 | Krueger | 210/58 |
| 4,015,973 | 4/1977 | Perrine | 71/64 C |

FOREIGN PATENT DOCUMENTS

| 1,387,839 | 3/1975 | United Kingdom | 71/64 C |

Primary Examiner—Charles N. Hart
Assistant Examiner—Ernest G. Therkorn
Attorney, Agent, or Firm—John T. O'Halloran; Peter C. Van Der Sluys

[57] ABSTRACT

A stable, homogeneous, and flowable soil neutralizing slurry of particulate material such as calcium carbonate or dolomitic lime as provided using a suspending agent and a dispersant. A polyanionic dispersant is used in limited quantities to increase the concentration of particulate material and a gelling grade clay mineral is used as a suspending agent to prevent settling of the dispersed particulate material. A partial dispersion technique is used whereby the amount of dispersant used is limited so that the particulate material is dispersed but not the clay mineral.

5 Claims, No Drawings

SOIL NEUTRALIZING SLURRIES

This is a continuation of application Ser. No. 539,214, filed Jan. 7, 1975, now abandoned.

BACKGROUND OF THE INVENTION

1. Field of the Invention

The present invention relates to use of stable, homogeneous slurries of particulate material and more particularly to a slurry of soil neutralizing material.

2. Description of the Prior Art

Agricultural lime such as calcium carbonate and dolomitic lime are normally applied as dry powders to sweeten or raise the pH level of soils in lawns, gardens and on farms. The lime products are prepared by grinding dolomitic lime, calcite or limestone to a variety of particle sizes or by using waste or by-products from other operations in the preparation of burnt lime, roadstone, chemical hydrate or other calcium-containing products. Particle sizes can vary from finer than 20 mesh (20/up) to finer than 100 mesh (100/up).

Application of these powdered materials in a dry state presented several well-known difficulties including uneven distribution and drifting of undesirable dust which is irritating and potentially dangerous to both humans and animals.

One proposed solution to these problems was to apply the lime as an aqueous slurry. Use of an aqueous lime slurry had many inherent advantages such as lower bulk, possibilities of much more even distribution, absence of dust, a degree of adhesion and adaptable to the simultaneous uniform application of other material.

The proposed aqueous lime slurry failed because of several reasons. Firstly, only unacceptably low lime concentrations could be prepared, because the rheological characteristics of undispersed limestone resulted in slurries that were difficult to pump and spray. Secondly, settling of the larger particle size components during make-down, storage handling or spraying further reduced the concentration and the settled material usually blocked the sprayer passages.

Attempts were made to increase the lime concentration by adding a dispersant such as tetrasodium pyrophosphate (TSPP), sodium tripolyphosphate (STP) or organic dispersants to lime slurries. The use of the dispersant allowed an increase in the concentration of particulate lime; however, it also increased the settling rate of the lime and resulted in failure since most of the lime would settle out within 15 minutes.

SUMMARY OF THE INVENTION

The present invention contemplates the use of dispersants, to increase the concentration of relatively insoluble particulate lime in an aqueous slurry in conjunction with an economical means for stabilizing the slurry and controlling the settling of the lime. Small amounts of gelling grade clay minerals are used as agents to suspend the particulate lime and to provide improved rheological characteristics. A partial dispersion technique is used to avoid dispersing the suspending agents. This technique requires the use of the proper type and quantity of dispersant so that only the lime is dispersed and not the suspending agent.

In brief, the subject invention provides a soil neutralizing slurry comprising a dispersed insoluble particulate lime, a small amount of dispersant and a flocculated attapulgite gelling agent in water and a method for making the same. Ionic concentrations must of necessity be low so that the dispersant will function.

In addition to suspending the particulate lime, the attapulgite gelling agent provides improved (more desirable, pseudoplastic) rheological characteristics for the slurry. At low shear force, a high apparent viscosity is exhibited thereby preventing or inhibiting settlement of the lime during storage. At higher shear forces, similar to those encountered during pumping and spraying a lower viscosity is exhibited which is conducive to a spraying operation.

The primary objective of the present invention is to provide an improved means for distributing agricultural lime.

Another objective of the present invention is to provide a lime slurry having a higher concentration than was heretofore available.

Another objective of the present invention is to provide a lime slurry that is stable and does not settle out rapidly.

Another objective of the present invention is to provide an inexpensive lime slurry that has improved rheological characteristics.

The foregoing and other objectives and advantages of the present invention will become more apparent from the following description in which three examples are described.

DESCRIPTION OF THE INVENTION

The invention teaches a soil neutralizing slurry of agricultural lime with a dispersing agent for increasing the lime concentration and a suspending agent to prevent settling of the insoluble lime.

The principle ingredients of the slurry are water and calcium carbonate or dolomitic lime. The generic term calcium carbonate includes calcite, limestone, and aragonite. Dolomitic lime, $CaMg(CO_3)_2$, and calcium carbonate will for the purposes of convenience be referred to as lime. The water should have limited dissolved ionic material for reasons to be discussed subsequently.

The lime must be ground to a powder of at least 20 mesh and finer and should preferably be finer than 80 mesh. The slurry should contain preferably 60 to 70% lime by-weight. This is a practical range since it is difficult to achieve higher lime concentrations and a lower concentration would not be attractive to the user. In addition, concentrations lower than 60% would require additional quantities of suspending agents since the slurry itself would be thinner due to the larger volume of water and the smaller quantity of lime.

The dispersants used are polyanionic and are used in limited quantities. Organic dispersants in the form of polyanionic polymers such as sodium salts of polyacrylates, polymethacrylates, polysulfonates, polystyrene maleates, etc., act as dispersants for the lime but not for the suspending agent. Inorganic polyphosphate dispersants such as tetrasodium pyrophosphate (TSPP), sodium tripolyphosphate (STP) and calgon may also be used in sufficiently low concentrations to disperse the lime without dispersing the suspending agent. A combination of both organic and inorganic dispersants may be used such as TSPP and Dispex N-40, a sodium polyacrylate dispersant sold by Allied Colloids of Ridgewood, N.J.

The polyphosphate dispersants have two adverse characteristics. First, when high concentrations are used they disperse the suspending agents so that the lime is not held in suspension. Second, the phosphate dispersants are subject to rapid reversion and the resultant orthophosphates are poor mineral dispersants. Thus, slurries made with polyphosphate dispersants as the sole dispersant have poor shelf life and must in general be used within a short period after making the slurry.

Dispersant concentrations must be low, generally 0.05 to 1.5% by-weight of the suspending agent present when condensed phosphates such as TSPP, STP or calgon are used to avoid degelling the suspending agent. The organic dispersants do not disperse the suspending agents. However, for economical reasons they are preferably kept at low concentrations such as 0.5 to 2% by-weight of the suspending agent present.

The amount of polyphosphate dispersant to be used is fairly critical if a partial dispersion is to be achieved. If an insufficient amount is used, viscosities will be too high and the lime will be difficult to disperse; if too much is used, viscosities will be too low and the lime will settle. The amount of dispersant needed will be determined by several factors including the hardness of water used. The ionic content, soluble ions, of the slurry must be low. In fact, the partial dispersion technique will not work if substantial dissolved ionic material is present since this interferes with the functioning of the dispersant. Thus, it is apparent that the hardness of the water used will have a direct bearing on the amount of dispersant required. Certain types of soluble polyvalent cations ($Ca^{++}$, $Mg^{++}$) that may be present in the water form inactive insoluble compounds with the dispersant resulting in the need for additional dispersant when these ions are present. Monovalent ions interfere with the charging and dispersing action of dispersants when the said ions are present in fairly low concentrations (salting out effect).

Gelling grade clay minerals, such as colloidal attapulgite, sepiolite, Wyoming bentonite, and hectorite, may be used for suspending agents either alone or in combination. The clay in colloidal form is dispersed mechanically and reflocculates autogenously to form a gel. A preferred gelling clay is colloidal attapulgite sold under the trade name of Min-U-Gel 200 by Pennsylvania Glass Sand Corporation.

The amount of clay required for proper suspension varies with the lime concentration, particle size and the amount of dispersant used; however, a range of 0.5 to 5.0% by-weight of the slurry has been found to be satisfactory.

A sample of mesh size 100/up ground calcium carbonate was obtained and an attempt was made to slurry this material in water at 60% solids using a paddle mixer. The powder wetted poorly and after about one-half was incorporated into the slurry it became too difficult to mix. The resultant slurry settled rapidly and was unsatisfactory.

Further experiments were conducted using TSPP and STP as dispersants at 0.5 parts per 2,000 parts by-weight of total slurry. In these tests, the calcium carbonate was easily wetted and the 60% solids were added with considerable ease; however, the resultant slurries settled within 15 minutes.

Clay suspended slurries were prepared with the same equipment using formulations as shown in the following Table I.

TABLE I

| SUSPENSIONS OF −100 MESH CALCIUM CARBONATE | | | |
|---|---|---|---|
| Formulation | A | B | C |
| Percent Solids | 70 | 60 | 60 |
| Ingredients (Parts by Weight) | | | |
| Water | 560 | 760 | 760 |
| TSPP | — | 0.5 | — |
| STP | 0.5 | — | — |
| Dispex N-40 | — | — | 0.4 |
| Min-U-Gel 200 | 40 | 40 | 40 |
| Ground $CaCO_3$ | 1400 | 1200 | 1200 |
| Total Parts | 2000.5 | 2000.5 | 2000.4 |
| Brookfield Viscosities, cps | | | |
| Immediate | | | |
| 10 RPM | 300 | 720 | 3400 |
| 20 RPM | 250 | 425 | 1750 |
| 50 RPM | 230 | 240 | 780 |
| 100 RPM | 230 | 150 | 400 |
| 24 Hrs. | | | |
| 10 RPM | 1400 | 4150 | 2500 |
| 20 RPM | 950 | 2175 | 1400 |
| 50 RPM | 660 | 960 | 680 |
| 100 RPM | 450 | 520 | 400 |
| Settling | none | none | none |
| Supernatant Liq. | none | slight | none |
| 3 weeks | | | |
| 10 RPM | — | — | 5000 |
| 20 RPM | — | — | 2450 |
| 50 RPM | — | — | 1100 |
| 100 RPM | — | — | 550 |
| Settling | — | — | none |
| Supernatant Liq. | — | — | slight |

The dispersants, TSPP, STP or Dispex N-40 were stirred into the water and the suspending agent, Min-U-Gel 200 was also added gradually while stirring. The ground calcium carbonate was then gradually added while stirring continued. This order of addition is not critical and the ground limestone can be added before the suspending agent; however, it is desirable to add the dispersant prior to the ground limestone.

The results of subsequent tests on the slurries are also shown in Table I. After 3 weeks, formulations A and B had set up to a very thick unpourable consistency. This was probably the result of reversion of the TSPP and STP to orthophosphates which are not dispersants. This trend is shown by the substantial increase in viscosity of formulations A and B during the first 24 hours after preparation. Thus, it is clear that formulations using phosphate dispersants must be used within a relatively short time after preparation.

It is clear from the data presented in Table I that formulation C using Dispex N-40 as a dispersant is the most desirable formulation since it appears to have rather long shelf life and remains pourable and sprayable.

The 10 rpm Brookfield viscosities are representative of storage conditions and should exhibit high apparent viscosities to prevent settling. The higher shear 100 rpm apparent viscosities are representative of pumping and spraying conditions and therefore low viscosities are desired. All three of the formulations exhibit high viscosities at 10 rpm and substantially lower viscosities at 100 rpm thereby exhibiting desirable rheological characteristics for a lime slurry.

After considering the data presented in Table I it was decided to run additional tests using sepiolite and Wyoming bentonite. Slurries having formulations as shown in Tables II and III were prepared and tested with the results shown in the Tables.

TABLE II

SUSPENSIONS OF −20 MESH CALCITE

| Formulation | A | B | C | D | E |
|---|---|---|---|---|---|
| Percent Solids | 70 | 70 | 70 | 70 | 70 |
| | Control | Control (Dispersed) | Attapulgite Suspension | Sepiolite Suspension | W. bentonite Suspension |
| Ingredients: (Parts by weight) | | | | | |
| Water | 300 | 300 | 260 | 280 | 290 |
| TSPP | — | 0.2 | 0.2 | 0.2 | 0.2 |
| Ground Calcite | 700 | 700 | 700 | 700 | 700 |
| Min-U-Gel 200 | — | — | 40 | — | — |
| Sepiolite | — | — | — | 20 | — |
| Wyoming Bentonite | — | — | — | — | 10 |
| Total Parts | 1000 | 1000.2 | 1000.2 | 1000.2 | 1000.2 |
| Brookfield Viscosities, cps | | | | | |
| Immediate | | | | | |
| 10 RPM | not run | not run | 4200 | 5600 | 23,200 |
| 20 RPM | | | 2400 | 3100 | 13,600 |
| 50 RPM | | | 1240 | 1480 | 6,920 |
| 100 RPM | | | 760 | 880 | 4,000 |
| 48 Hrs. | | | | | |
| 10 RPM | not run | not run | 6000 | 9200 | not run, too thick |
| 20 RPM | | | 3200 | 7800 | |
| 50 RPM | | | 2100 | 5200 | |
| 100 RPM | | | 1200 | 2550 | |
| Comments | Settled out rapidly (no suspension) | Coarse Particles settled, fines suspended | No settling, good sprayability | No settling, initially good sprayability | No settling, probably could be sprayed initially |

TABLE III

SUSPENSIONS OF −100 MESH GROUND LIMESTONE

| Formulation | A | B | C | D |
|---|---|---|---|---|
| Percent Solids | 70 | 70 | 70 | 70 |
| Ingredients: (parts by weight) | | | | |
| Water | 290 | 285 | 295 | 292.5 |
| TSPP | 0.2 | 0.2 | 0.2 | 0.2 |
| Fine Limestone | 700 | 700 | 700 | |
| Sepiolite | 10 | 15 | — | — |
| Wyoming Bentonite | — | — | 5 | 7.5 |
| Total Parts | 1000.2 | 1000.2 | 1000.2 | 1000.2 |
| Brookfield Viscosities, cps | | | | |
| Immediate | | | | |
| 10 RPM | 6000 | 22,000 | 5000 | 18,800 |
| 20 RPM | 3200 | 13,600 | 3300 | 10,900 |
| 50 RPM | 1440 | 5,300 | 2560 | 5,326 |
| 100 RPM | 840 | 2,880 | 1260 | 3,320 |
| 48 Hrs. | | | | |
| 10 RPM | 10,400 | 21,600 | 18,000 | 37,000 |
| 20 RPM | 7,500 | 15,600 | 9,200 | 20,000 |
| 50 RPM | 3,200 | 7,680 | 4,320 | 9,600 |
| 100 RPM | 1,720 | >4,000 | 2,260 | 5,000 |
| Comments | No settling, sprayable | No settling, initially sprayable | No settling, initially sprayable | No settling, not sprayable |

The tests clearly show that Wyoming bentonite suspensions are less stable than suspensions of attapulgite and sepiolite; however, they could be used in situations where immediate use is contemplated.

Thus, it is apparent that the present invention provides a stable, lime slurry that exhibits improved rheological characteristics. The invention provides an aqueous slurry having a high concentration of lime which is prevented from settling by the use of a suspending agent. Using the present invention, lime may be evenly distributed during field application and the problems associated with drifting dust are not experienced. By applying the lime as an aqueous slurry, the adhesion qualities are also improved resulting in a more efficient use of the lime.

What is claimed is:

1. A highly concentrated, homogeneous, stable and pourable soil neutralizing slurry, comprising:
   water;
   at least one dispersed ground particulate material, selected from the group consisting of calcium carbonate and dolomitic lime, in an amount equal to 60 to 70% by-weight of the slurry;
   a gelling grade clay mineral additive selected from the group consisting of attapulgite, sepiolite, Wyoming bentonite and hectorite in an amount of from 0.5 to 5.0% by-weight of said slurry to maintain the particulate material in a stable, homogeneous suspension that is pourable; and
   a polyanionic dispersing agent in an amount of from 0.05 to 2.0% by-weight of the clay mineral to disperse the particulate material but not the clay mineral, wherein high concentrations of particulate material are dispersed in a homogeneous slurry that is stable and not subject to settlement while being pourable and readily adapted to application by spraying.

2. The slurry of claim 1 wherein the polyanionic dispersing agent is an organic dispersing agent in the range of 0.5 to 2.0% by weight of the clay mineral and selected from the group consisting of sodium salts of polyacrylates, polymethacrylates, polysulfonates, and polystyrene malieates.

3. A method of neutralizing soil by use of a soil neutralizing slurry containing limestone and clay made by the steps of:
   adding a polyanionic dispersing agent in an amount of from 0.05 to 2.0% by weight of clay to water and stirring;
   gradually adding the clay in an amount of from 0.5 to 5.0% by weight of the limestone into the mixture while stirring to distribute the clay and thereby form a gel suspension; and
   gradually adding the limestone in an amount of 60 to 70% by-weight of the slurry while stirring, said limestone selected from the group consisting of calcium carbonate and dolomitic lime to form a stable homogeneous slurry that is pourable.

4. The method of claim 3, wherein the dispersing agent is an organic dispersing agent in an amount equal to 0.5 to 2% by weight of the clay and is selected from the group consisting of sodium salts of polyacrylates, polymethacrylates, polysulfonates and polystyrene maleates.

5. The method of claim 3, wherein the dispersing agent is an inorganic dispersing agent in an amount equal to 0.05 to 1.5% by weight of the clay and is selected from the group consisting of tetrasodium pyrophosphate sodium tripolyphosphates and calgon.

* * * * *